(12) United States Patent
Mouri et al.

(10) Patent No.: US 11,874,056 B2
(45) Date of Patent: Jan. 16, 2024

(54) OPERATION GUIDANCE SEARCHING METHOD AND OPERATION GUIDANCE SEARCHING SYSTEM

(71) Applicant: JGC CORPORATION, Kanagawa (JP)

(72) Inventors: Kenji Mouri, Kanagawa (JP); Hirokatsu Uchida, Kanagawa (JP)

(73) Assignee: JGC CORPORATION, Kanagawa (JP)

( * ) Notice: Subject to any disclaimer, the term of this patent is extended or adjusted under 35 U.S.C. 154(b) by 457 days.

(21) Appl. No.: 17/294,425

(22) PCT Filed: May 13, 2019

(86) PCT No.: PCT/JP2019/018954
§ 371 (c)(1),
(2) Date: May 17, 2021

(87) PCT Pub. No.: WO2020/230239
PCT Pub. Date: Nov. 19, 2020

(65) Prior Publication Data
US 2021/0396463 A1   Dec. 23, 2021

(51) Int. Cl.
*F25J 1/00* (2006.01)
*G06N 20/00* (2019.01)
*F25J 1/02* (2006.01)

(52) U.S. Cl.
CPC ........... *F25J 1/0022* (2013.01); *F25J 1/0247* (2013.01); *F25J 1/0254* (2013.01); *G06N 20/00* (2019.01)

(58) Field of Classification Search
CPC ........ F25J 1/0022; F25J 1/0254; F25J 1/0052; G06N 20/00
See application file for complete search history.

(56) References Cited

U.S. PATENT DOCUMENTS

2018/0356149 A1\* 12/2018 Spaander ............... F25J 1/0022

FOREIGN PATENT DOCUMENTS

AU   2018202638   9/2018
JP   2013540973   11/2013
(Continued)

OTHER PUBLICATIONS

"Office Action of Algeria Counterpart Application", dated Mar. 27, 2022, p. 1.
(Continued)

*Primary Examiner* — Lionel Nouketcha
(74) *Attorney, Agent, or Firm* — JCIPRNET

(57) ABSTRACT

Provided is a technology of searching for operation guidance for efficiently operating a liquefied natural gas plant. An operation guidance searching method for a liquefied natural gas plant includes: acquiring data sets of operation data of process variables for a plurality of target devices and disturbance data; generating, through machine learning, a plant model indicating correspondences of output values of process variables with respect to manipulated variables and input values of disturbances; and searching, through reinforcement learning, for input values of the manipulated variables operation variables for with which a compression power per unit production amount is minimized under a condition in which an outlet temperature of a liquefied natural gas is a preset restriction temperature or lower.

11 Claims, 6 Drawing Sheets

(56) References Cited

FOREIGN PATENT DOCUMENTS

| JP | 2017142595 | 8/2017 |
|----|------------|--------|
| JP | 6286812 | 3/2018 |
| WO | 2007123924 | 11/2007 |

OTHER PUBLICATIONS

"International Preliminary Report on Patentability(Form PCT/IB/373) of PCT/JP2019/018954," dated Nov. 16, 2021, with English translation thereof, pp. 1-10.

"International Search Report (Form PCT/ISA/210) of PCT/JP2019/018954," dated Jul. 30, 2019, with English translation thereof, pp. 1-4.

* cited by examiner

OPERATION GUIDANCE SEARCHING METHOD AND OPERATION GUIDANCE SEARCHING SYSTEM

CROSS-REFERENCE TO RELATED APPLICATION

This application is a 371 application of the International PCT application serial no. PCT/JP2019/018954, filed on May 13, 2019. The entirety of the above-mentioned patent application is hereby incorporated by reference herein and made a part of this specification.

TECHNICAL FIELD

The present invention relates to a technology of analyzing operation of a liquefied natural gas plant.

BACKGROUND ART

In a liquefied natural gas plant (hereinafter also referred to as "LNG plant") configured to liquefy a natural gas, processing of cooling the natural gas (NG) with the use of a refrigerant to obtain a liquefied natural gas (LNG) is performed. The LNG plant includes a large number of devices including, for example, a heat exchanger configured to cool a fluid to be cooled (for example, NG or another refrigerant) with the use of the refrigerant, a compressor configured to compress a vaporized refrigerant, and an air-cooled heat exchanger (ACHE) configured to cool the compressed refrigerant.

Operation states of those devices are changed depending on disturbances, such as an outside air temperature, a supply pressure of the NG, and composition of the NG. In the LNG plant, various operation adjustments are made so that the LNG can be produced efficiently with a smaller amount of input energy despite being affected by the disturbances. However, the kinds of disturbances and how the devices are affected by the disturbances are different for each device. Further, as a result of a particular device being affected by the disturbances to change the operation state, the operation state of another device may be affected.

As described above, in the LNG plant, the large number of devices are correlated with one another while being affected by a plurality of kinds of disturbances to change the operation states. Therefore, when a change of the disturbances occurs, it is difficult to identify what kind of operation adjustments are made more efficiently in the large number of devices included in the LNG plant.

In Patent Literature 1, there is described a technology in which current parameters at present of an LNG production plant are measured, and with Carnot factor being an indicator of operation efficiency, optimal composition of a mixed refrigerant used to liquefy an LNG is determined through model prediction control. However, a technology for optimizing with the use of another method is not described.

CITATION LIST

Patent Literature

[PTL 1] AU 2018202638 B1

SUMMARY

Technical Problem

The present invention has been made under the above-mentioned background, and therefore provides a technology of searching for operation guidance for efficiently operating a liquefied natural gas plant.

Solution to Problem

According to one embodiment of the present invention, there is provided an operation guidance searching method for a liquefied natural gas plant, the liquefied natural gas plant including a liquefying heat exchanger configured to liquefy a natural gas with use of a liquefying refrigerant to obtain a liquefied natural gas, and a compressor configured to compress a refrigerant gas obtained after refrigerants including the liquefying refrigerant, which are used in the liquefied natural gas plant, are vaporized, the operation guidance searching method including the steps of: acquiring a plurality of data sets including operation data and disturbance data, the operation data indicating actual values of process variables at least including a compression power of the compressor and including controlled variables and manipulated variables for a plurality of target devices forming the liquefied natural gas plant, the disturbance data indicating actual values of disturbances affecting the process variables; generating, through machine learning using a computer, based on the plurality of data sets, a plant model indicating correspondences of output values of process variables other than the manipulated variables with respect to the manipulated variables and input values of the disturbances; and giving the input values of the disturbances and initial values of the manipulated variables to the plant model, and searching, through reinforcement learning using the computer, for input values of the manipulated variables with which the compression power per unit production amount of the liquefied natural gas is minimized under a condition in which an outlet temperature of the liquefied natural gas is a preset restriction temperature or lower.

The operation guidance searching method may include the following features.

(a) The operation guidance searching method further includes a step of determining, based on a plurality of the input values of the manipulated variables retrieved in the step of searching for input values of the manipulated variables, input values to be actually used as the manipulated variables in operation of the liquefied natural gas plant.

(b) The disturbances include disturbances selected from a disturbance group consisting of an outside air temperature in an installation area of the liquefied natural gas plant, a supply pressure of the natural gas to the liquefied natural gas plant, composition of the natural gas, a supply temperature of the natural gas, and a supply amount of the natural gas.

(c) The machine learning includes generating the plant model with use of at least one of the following methods: a deep neural network, support vector regression, random forest regression, and partial least squares.

(d) The process variables other than the compression power of the compressor include process variables selected from a process variable group consisting of a temperature of the natural gas on an inlet side of the liquefying heat exchanger, a temperature of the liquefying refrigerant on the inlet side of the liquefying heat exchanger, and a discharge pressure at which the compressor discharges the liquefying refrigerant, and the manipulated variables include manipulated variables selected from a manipulated variable group consisting of a gas flow rate of the liquefying refrigerant, a liquid flow rate of the liquefying refrigerant, composition of the liquefying refrigerant, the number of rotations of a rotary driver in a case in which the compressor is driven by the rotary driver, and an opening degree of an inlet guide vane of the compressor. When the refrigerants include at least one of a precooling refrigerant used to precool the natural gas before the natural gas is liquefied with the liquefying refrigerant, or a refrigerant for cooling a refrigerant used to cool the liquefying refrigerant, the process variable group further includes, as a process variable, at least one of a temperature of the precooled natural gas or a temperature of the cooled liquefying refrigerant.

Further, according to one embodiment of the present invention, there is provided an operation guidance searching system for a liquefied natural gas plant, the operation guidance searching system including: a data acquisition unit configured to acquire a plurality of data sets including operation data and disturbance data from the liquefied natural gas plant, the liquefied natural gas plant including a liquefying heat exchanger configured to liquefy a natural gas with use of a liquefying refrigerant to obtain a liquefied natural gas, and a compressor configured to compress a refrigerant gas obtained after refrigerants including the liquefying refrigerant are vaporized, the operation data indicating actual values of process variables at least including a compression power of the compressor, and including controlled variables and manipulated variables for a plurality of target devices forming the liquefied natural gas plant, the disturbance data indicating actual values of disturbances affecting the process variables; a plant model generating unit configured to generate, through machine learning using a computer, based on the plurality of data sets acquired by the data acquisition unit, a plant model indicating correspondences of output values of process variables other than the manipulated variables with respect to the manipulated variables and input values of the disturbances; and an operation guidance searching unit configured to give the input values of the disturbances and initial values of the manipulated variables to the plant model generated by the plant model generating unit, and search, through reinforcement learning using the computer, for input values of the manipulated variables with which the compression power per unit production amount of the liquefied natural gas is minimized under a condition in which an outlet temperature of the liquefied natural gas is a preset restriction temperature or lower.

Advantageous Effects of Invention

According to the technology, the plant model of the liquefied natural gas plant is generated through the machine learning, and the reinforcement learning is further performed to search for the values of the manipulated variables with which the compression power of the refrigerants per unit production amount of the liquefied natural gas is minimized so that operation optimal for the disturbances can be performed.

DESCRIPTION OF EMBODIMENTS

Figure 1:
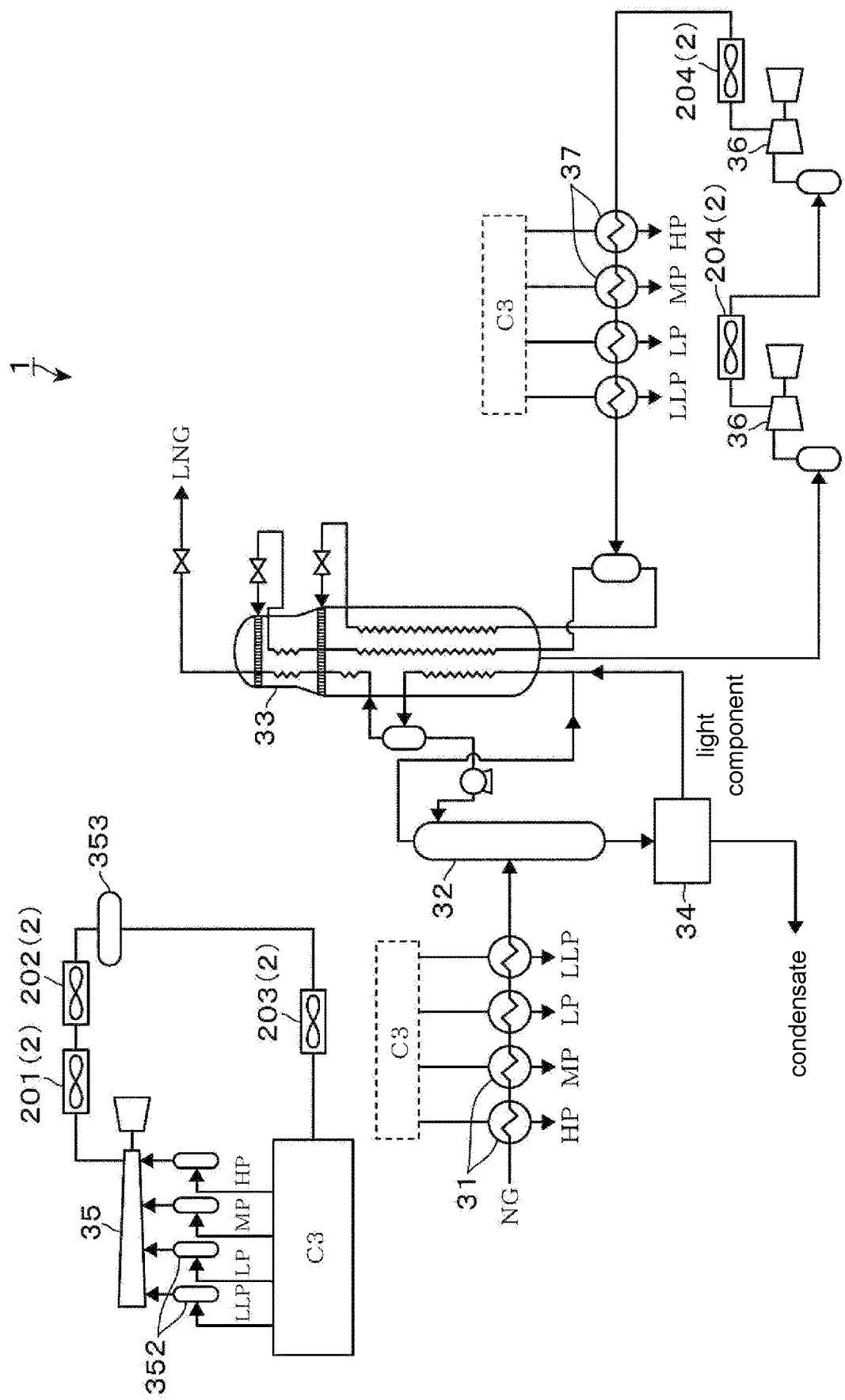
FIG. 1 shows a configuration example of the LNG plant to which an operation guidance searching method according to an embodiment of the present invention is applied.

FIG. 1 shows a configuration example of an LNG plant 1 to which an operation guidance searching method according to an embodiment of the present invention is applied.

In the LNG plant 1 in this embodiment, a natural gas (NG) from which impurities are removed through pretreatment is precooled by a precooling heat exchanger 31, is separated into gas and liquid by a scrub column 32, and then is liquefied and subcooled by a main cryogenic heat exchanger (MCHE) 33 serving as a liquefying heat exchanger to obtain an LNG. The liquid obtained by the separation into gas and liquid by the scrub column 32 is rectified by a fractionation unit 34, and a light component separated in the rectification process is sent to the MCHE 33 to form the LNG.

As a liquefying refrigerant used to liquefy and subcool the NG, there is used a mixed refrigerant (MR) obtained by mixing a plurality of kinds of refrigerant materials selected from a refrigerant material group including nitrogen, and methane, ethane, or propane, which is a hydrocarbon.

The MR used to liquefy and subcool the NG flows out of the MCHE 33 in a gaseous state, is compressed sequentially by a plurality of MR compressors 36 driven by gas turbines (G/Ts), for example, and is cooled by an MR cooler 204 (formed of an air-cooled heat exchanger (ACHE) 2) provided on an outlet side of each MR compressor 36. The compressed and cooled MR is further cooled by MR coolers 37, and then is supplied to the MCHE 33 again. The MR corresponds to one of refrigerants used in the LNG plant 1.

The LNG plant 1 in the embodiment uses a C3 refrigerant made of a single component of propane or propylene as a refrigerant used to precool the NG in the precooling heat exchanger 31, and as a refrigerant used to cool the MR in the MR coolers 37. The C3 refrigerant used to precool the NG and to cool the MR is also compressed and cooled, and then is supplied to the precooling heat exchanger 31 and the MR coolers 37 again.

A liquid C3 refrigerant is reduced in pressure via expansion valves (not shown), and is supplied to the C3 coolers 31 and 37 in a state of being reduced in temperature through adiabatic expansion to cool respective fluids to be cooled (the NG and the MR). The C3 refrigerant corresponds to one of the refrigerants used in the LNG plant 1.

In the subsequent stage of a C3 refrigerant compressor 35, a desuperheater 201 configured to cool a gas C3 refrigerant that has been increased in temperature in the process of compression in a gaseous state, a condenser 202 configured to further cool and compress the gas C3 refrigerant that has been cooled by the desuperheater 201, a receiver (receiver tank) 353 configured to store the liquid C3 refrigerant that has flowed out of the condenser 202, and a subcooler 203 configured to further cool the liquid C3 refrigerant into a subcooled state are provided in the stated order from the upstream side. The liquid C3 refrigerant subcooled by the subcooler 203 is sent to the C3 coolers 31 and 37 again via the above-mentioned expansion valves. Each of the desuperheater 201, the condenser 202, and the subcooler 203 is also formed of an ACHE 2.

The LNG plant 1 is formed of a large number of devices, such as the compressors (the C3 refrigerant compressor 35 and the MR compressors 36), the MR coolers 37, the precooling heat exchanger 31, the scrub column 32, rectifying columns of the fractionation unit 34, and the MCHE 33 described above, and various pretreatment facilities configured to pretreat the NG. Those devices include, for example, static devices, such as columns, tanks, and heat exchangers, and dynamic devices, such as pumps.

Those devices include a large number of devices (corresponding to "target devices" in the embodiment) on which control for bringing controlled variables closer to set values is performed by adjusting manipulated variables under a certain condition of a disturbance, for example, a change in outside air temperature. Further, operation states of the target devices are measured by various measuring devices (not shown), such as a pressure indicator (PI), a temperature indicator (TI), a flow meter (FI), a chemical composition analyzer (AI), and dynamometers (SC) configured to measure respective powers of the compressors 35 and 36.

The various measuring devices can also measure various measurement values of devices (corresponding to "target devices" in the embodiment) that are not control targets, in addition to the manipulated variables and the controlled variables of the above-mentioned devices as control targets. The manipulated variables, the controlled variables, and the other variables for which data can be acquired with the use of the various measuring devices are hereinafter collectively referred to as "process variables." Operation data indicating actual values of the process variables may be data obtained through direct measurement by the various measuring devices, or data calculated based on measurement results.

The LNG plant 1 also includes various measuring devices (not shown) configured to measure the disturbances, such as an outside air temperature, a wind direction, and a wind speed in an area in which the LNG plant 1 is installed, a supply pressure of the NG, and composition of the NG. As disturbance data indicating actual values of those disturbances, data obtained through direct measurement by the various measuring devices, and data calculated based on measurement results are similarly used.

The various measuring devices provided in the LNG plant 1 acquire, on the time series, the operation data and the disturbance data, or data for calculating those pieces of data at data acquisition intervals (for example, at intervals of one second or one minute) preset for each of the measuring devices.

Figure 2:
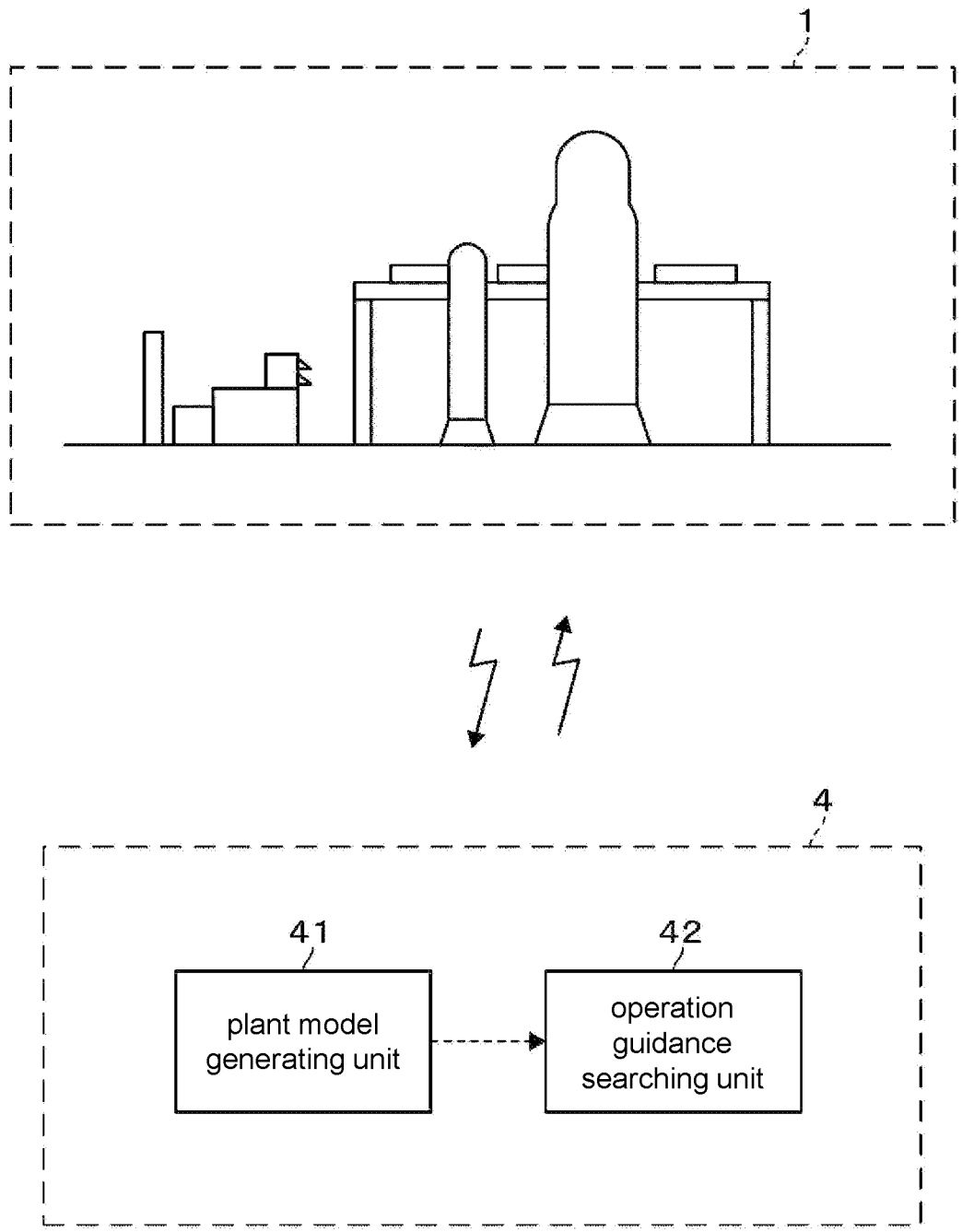
FIG. 2 is a configuration diagram of an operation guidance searching system.

FIG. 2 shows a configuration example of an operation guidance searching system 4 according to the embodiment. The operation guidance searching system 4 is configured to search, with the use of the operation data and the disturbance data described above, for input values of the manipulated variables with which powers (compression powers) of the compressors (in the embodiment, the C3 refrigerant compressor 35 and the MR compressors 36) per unit production amount of the LNG are minimized under predetermined disturbance conditions. A compressor power per unit production amount of the LNG is hereinafter also referred to as "specific power (SP)."

The operation guidance searching system 4 includes a data acquisition unit configured to acquire a large number of data sets including the operation data and the disturbance data acquired from the LNG plant 1 on the time series, a plant model generating unit 41 configured to generate a plant model of the LNG plant 1 through machine learning based on the large number of data sets, and an operation guidance searching unit 42 configured to search for the input values of the manipulated variables with which the SP is minimized through reinforcement learning using the plant model.

The operation guidance searching system 4 according to the embodiment can be formed of, for example, a computer provided at a location remote from the area in which the LNG plant 1 is installed. In this case, the data acquisition unit is formed as a data communication unit configured to acquire the large number of data sets from the LNG plant 1 through data communication. The data acquisition unit is configured to acquire all of the operation data and the disturbance data acquired in a predetermined period (for example, one week or one month) in the LNG plant 1. Those pieces of data include the operation data and the disturbance data used in the machine learning of the plant model by the plant model generating unit 41. Instead of acquiring all those pieces of data, operation data and disturbance data to be used in the machine learning may be selected in advance, and only the selected pieces of data may be acquired.

When a set of operation data and disturbance data at each time point on the time series is defined as a data set, the plant model generating unit 41 generates, through the machine learning using the large number of data sets, the plant model indicating correspondences of output values of the process variables (excluding the manipulated variables) with respect to the manipulated variables and input values of the disturbances. The plant model generating unit 41 is formed of, for example, a computer having installed therein a program for executing the machine learning.

The plant model generating unit 41 may carry out the machine learning using at least one of the following known methods: a deep neural network, support vector regression, random forest regression, and partial least squares. Alternatively, the machine learning may be carried out by combining two or more of the above-mentioned methods.

The plant model generating unit 41 executes the machine learning with the use of the operation data at least including the compression powers of the compressors (the C3 refrigerant compressor 35 and the MR compressors 36). The machine learning may be carried out by further using, as the operation data, at least one process variable selected from a process variable group consisting of, for example, a temperature of the NG on an inlet side of the MCHE 33, a temperature of the MR on the inlet side of the MCHE 33, a discharge pressure of the MR compressors 36, and the powers of the MR compressors 36. Further, in the LNG plant 1 using the C3 refrigerant for precooling the NG or cooling the MR, the process variable group may further include, as the process variables, at least one of a temperature of the precooled NG or a temperature of the cooled MR.

The plant model generating unit 41 in the embodiment may further carry out the machine learning using operation data of at least one manipulated variable selected from an manipulated variable group consisting of, for example, a gas flow rate of the MR refrigerant, a liquid flow rate of the MR refrigerant, composition of the MR refrigerant, the number of rotations of each of rotary drivers in a case in which the compressors (the C3 refrigerant compressor 35 and the MR compressors 36) are driven by the rotary drivers, and an opening degree of an inlet guide vane of the compressors.

The operation data used in the machine learning is not limited to the variables listed in the process variable group and the manipulated variable group described above, and may include operation data of other process variables.

The plant model generating unit 41 can also perform the machine learning using, as the disturbances, the disturbance data for disturbances selected from a disturbance group consisting of, for example, the outside air temperature of the installation area of the LNG plant 1, the supply pressure of the NG to the LNG plant 1, the composition of the NG, a supply temperature of the NG, and a supply amount of the NG.

The operation guidance searching unit 42 is configured to search, through the reinforcement learning using the plant model generated by the plant model generating unit 41, for the input values of the manipulated variables with which the above-mentioned SP is minimized. The operation guidance searching unit 42 is formed of, for example, a computer having installed therein a program for executing the reinforcement learning.

There can be exemplified a case in which the operation guidance searching unit 42 searches, through known deep reinforcement learning, for example, proximal policy optimization or deep Q network, for the input values of the manipulated variables with which the SP is minimized. Without limiting to the deep reinforcement learning, the operation guidance searching unit 42 may search for the input values of the manipulated variables through other kinds of reinforcement learning.

In particular, the operation guidance searching unit 42 has a feature of performing the search under a condition in which an outlet temperature of the LNG from the MCHE 33 is a preset restriction temperature or lower. With the addition of this restriction, a possibility that unrealistic input values of the manipulated variables are retrieved can be eliminated effectively.

A method of searching for the input values of the manipulated variables with which the SP is minimized with the use of the operation guidance searching system 4 having the above-mentioned configuration is described with reference to FIG. 3 to FIG. 9.

Figure 3:
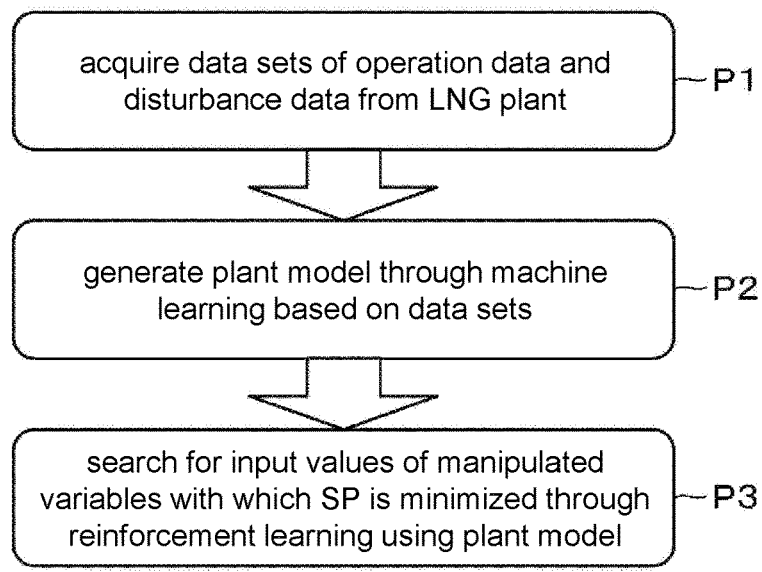
FIG. 3 is an explanatory chart for illustrating a procedure of performing the operation guidance searching method.

First, a large number of data sets of the operation data and the disturbance data are acquired from the LNG plant 1 by the operation guidance searching system 4 (Process P1 of FIG. 3).

Next, based on those data sets, the plant model is generated through the machine learning (Process P2 of FIG. 3). Specifics of the process are described in detail with reference to a flow of FIG. 4.

First, the pretreatment of removing, from the acquired data sets, data sets containing abnormal data, and data sets in which some of the operation data and the disturbance data are missing is performed (Step S201).

Thereafter, variables (process variables and disturbances) used in generating the plant model and a model type of the machine learning (above-mentioned deep neural network, support vector regression, or the like, or a combination thereof) are selected (Step S202). As the variables, process variables at least including the compression power and further selected from the above-mentioned process variable group, and other process variables, and disturbances selected from the disturbance group, and other disturbances can be selected.

Figure 5:
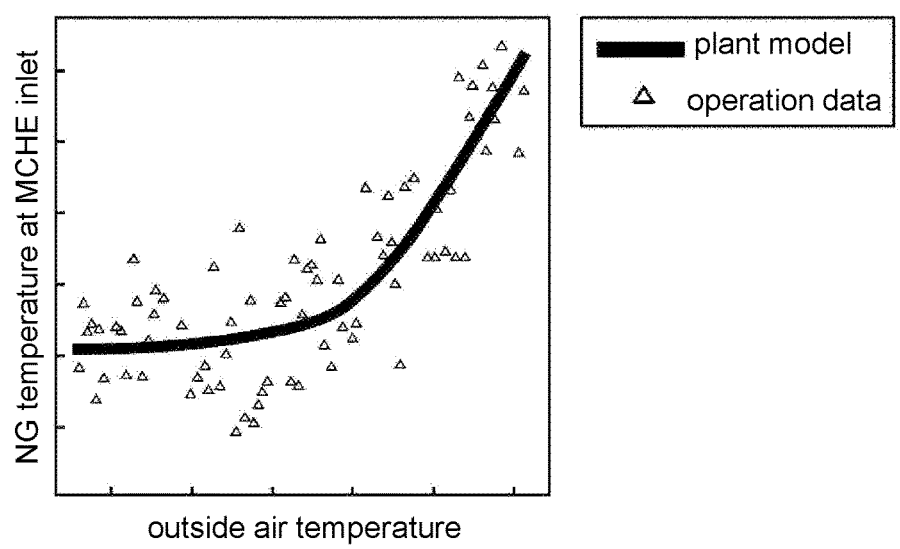
FIG. 5 are explanatory graphs for showing learning results of correspondences between disturbances and process variables.
Figure 5:
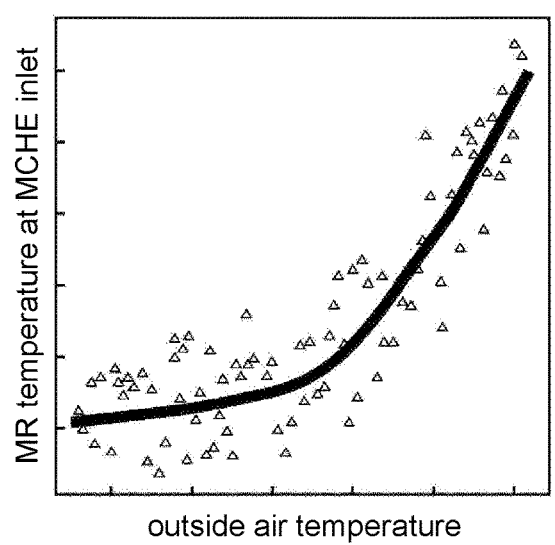
Figure 5:
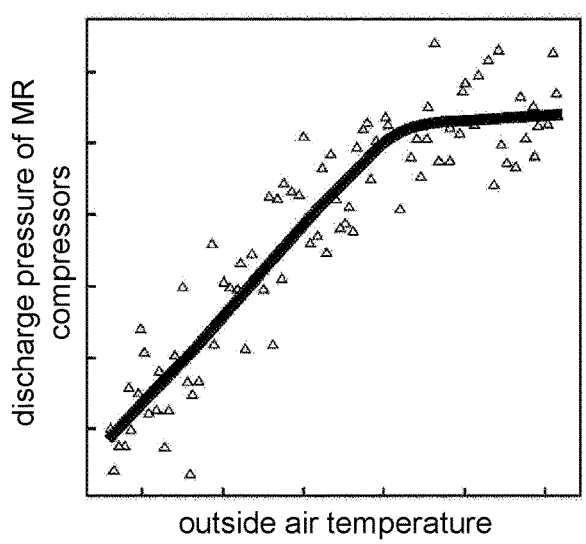

Next, the plant model is generated through the machine learning by the plant model generating unit 41 (Step S203). (a) of FIG. 5 to (c) of FIG. 5 show some of outputs of the generated plant model. For example, (a) of FIG. 5 to (c) of FIG. 5 show correspondences between the outside air temperature, which is one of the disturbances, and the temperature of the NG at the inlet of the MCHE 33, the temperature of the MR at the inlet of the MCHE 33, and the discharge pressure of the MR compressors 36, which are the process variables, respectively. In the plant model, a large number of correspondences between the selected disturbances or manipulated variables and the selected process variables (excluding the manipulated variables) are acquired.

Figure 4:
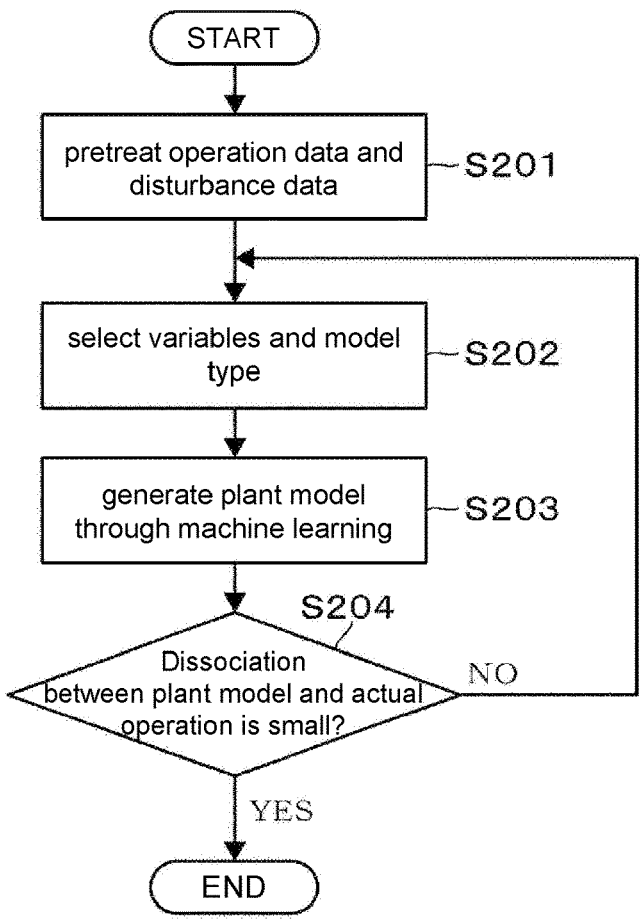
FIG. 4 is a flow chart for illustrating a flow of operation of generating a plant model.

Thereafter, it is checked whether the generated plant model dissociates from actual operation of the LNG plant 1 (Step S204 of FIG. 4). For example, an evaluator having skill in the actual operation of the LNG plant 1 evaluates whether correspondences of the process variables against actual cause-and-effect relationships and physical laws with respect to the disturbances and directions of change in manipulated variables are generated.

Then, when the dissociation is large (Step S204: NO), the selections of the variables and the model type are changed (Step S202), and the machine learning is performed again (Step S203). Further, when the dissociation is small (Step S204: YES), the machine learning by the operation guidance searching unit 42 ends.

Next, through the known deep reinforcement learning using the plant model generated with the use of the operation guidance searching unit 42, the input values of the manipulated variables with which the SP is minimized are searched for (Process P3 of FIG. 3).

Figure 7:
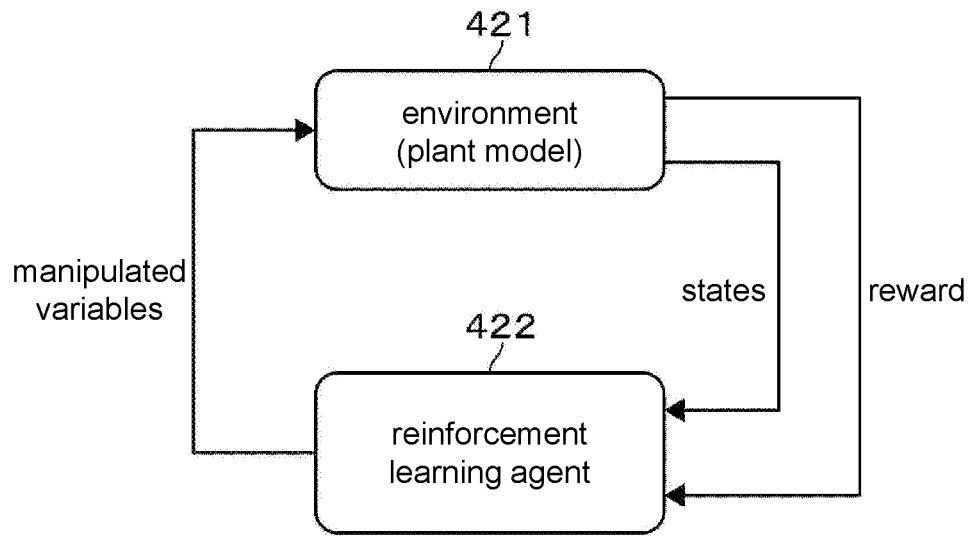
FIG. 7 is an explanatory diagram of reinforcement learning for searching for operation guidance.

As illustrated in FIG. 7, the operation guidance searching unit 42 carries out the reinforcement learning using an environment 421 including the above-mentioned plant model and a reinforcement learning agent 422. The environment 421 receives the input values of the disturbances and the manipulated variables, and outputs values of the process variables (excluding the manipulated variables) specified with the use of the plant model.

The reinforcement learning agent 422 acquires values (states) of the process variables output from the environment 421, and a result of calculating a reward with the use of the values, and generates, in accordance with a preset learning policy, a new set of manipulated variables with which the reward can be improved (that is, a value of the SP obtained by the plant model can be reduced). As the learning policy, a value-based method, for example, deep Q network, or a policy-based method, for example, proximal policy optimization can be exemplified.

Figure 6:
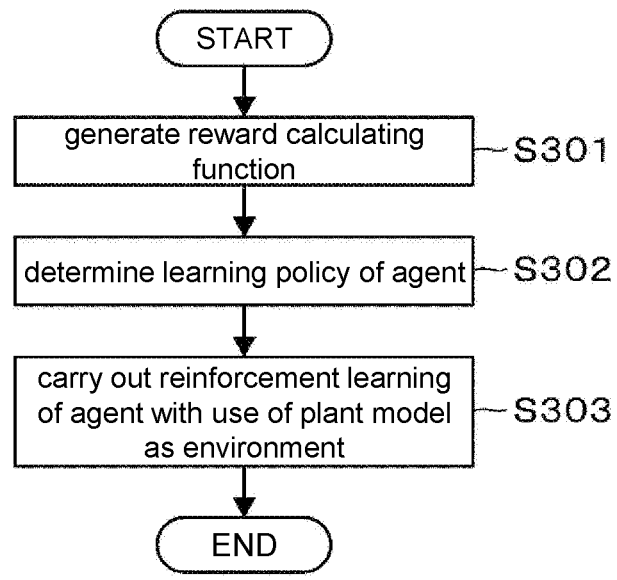
FIG. 6 is a flow chart for illustrating a flow of operation of the reinforcement learning.

To describe specifics of Process P3 illustrated in FIG. 3 with reference to FIG. 6, first, a reward calculating function for evaluating the values of the process variables output from the environment 421 is generated (Step S301). Further, the learning policy of the reinforcement learning agent 422 is determined (Step S302).

Next, with the use of the plant model generated by the plant model generating unit 41 as the environment 421, the reinforcement learning is carried out by the reinforcement learning agent 422 (Step S303). At this time, at the start of the reinforcement learning, the input values of the disturbances and appropriate initial values of the manipulated variables are given to the environment 421, and a loop of the reinforcement learning illustrated in FIG. 7 is repeated. When an improvement width of the reward in one learning loop becomes negligibly small, the reinforcement learning ends ("End").

Figure 9:
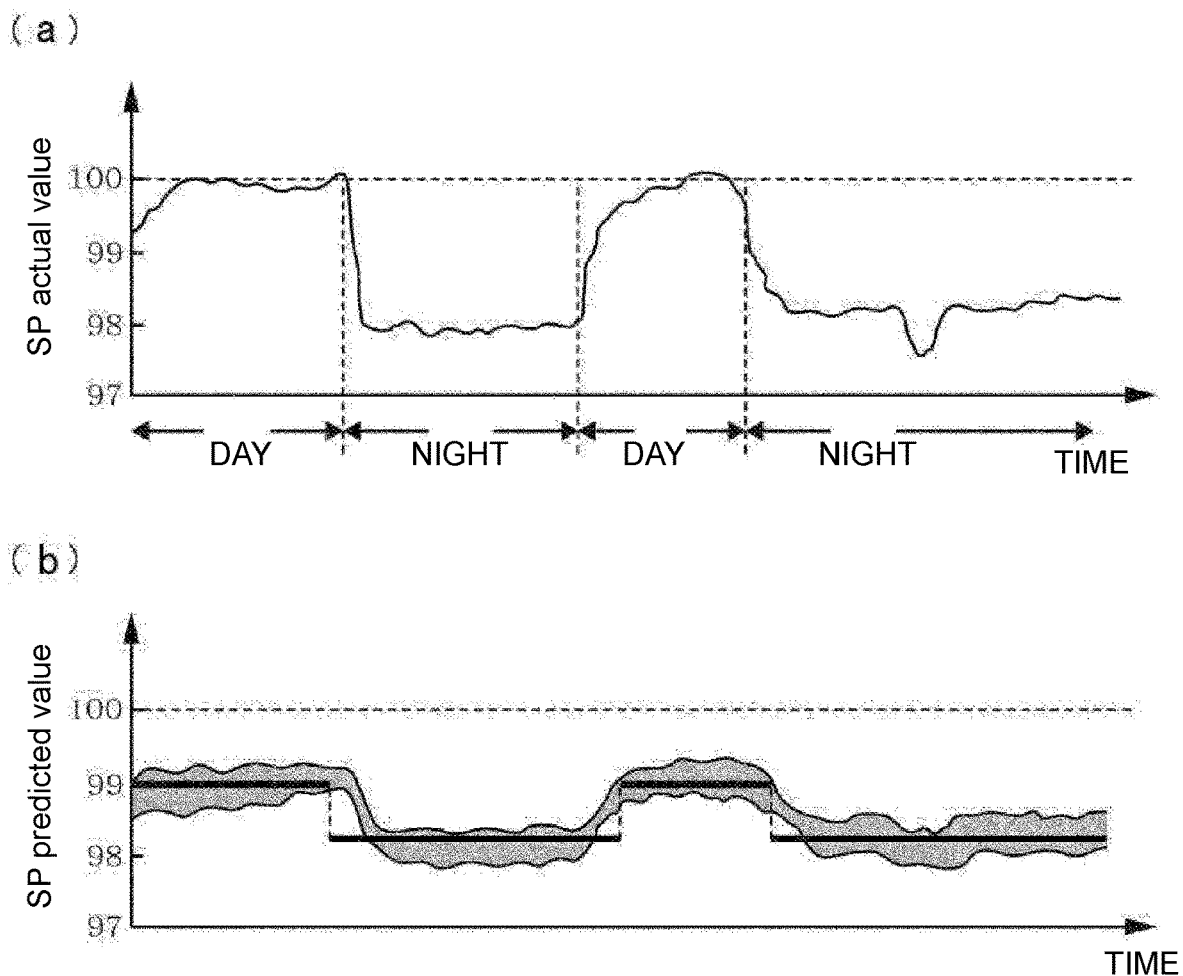
FIG. 9 are explanatory graphs for showing changes with time of an actual value and a predicted value of an SP.

(a) of FIG. 9 shows a change with time of an actual value of the SP in the LNG plant 1. Further, (b) of FIG. 9 shows a predicted value of the SP estimated based on the input values of the manipulated variables determined by generating the plant model with the use of the operation data and the disturbance data in the period in which the actual value of (a) of FIG. 9 is obtained, and performing the reinforcement learning under the condition of the disturbances in the period. As the actual value and the predicted value of the SP, values standardized with a common value being 100% are shown.

It is found from (a) of FIG. 9 that the SP is changed significantly in accordance with a change in temperature in the day time and the night time. In other words, in the day-time period in which the temperature rises, the SP is increased.

Meanwhile, it is found that an optimal value of the SP obtained as a result of the reinforcement learning varies significantly in an extremely short interval, and is changed with a predetermined band width as illustrated in (b) of FIG. 9 when seen macroscopically. At this time, setting of the input values of the manipulated variables obtained as a result of the reinforcement learning directly as the set values of the manipulated variables in the LNG plant 1 changes the set value in the extremely short interval, and is not realistic.

Figure 8:
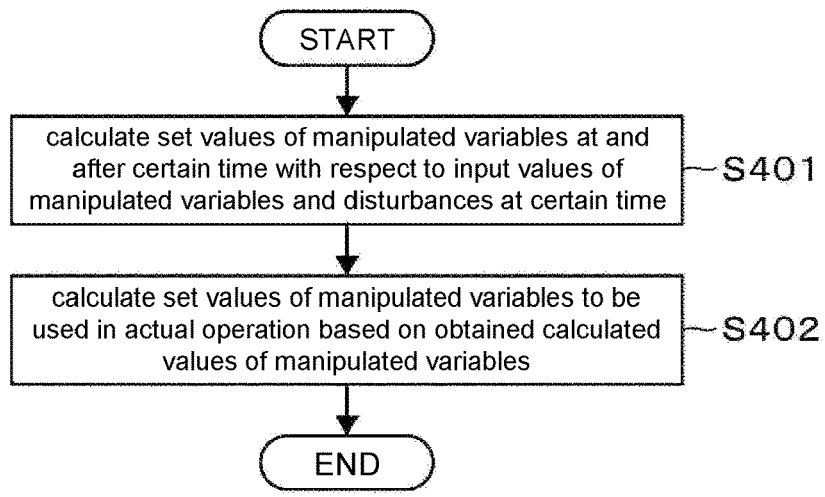
FIG. 8 is a flow chart for illustrating a flow of operation of determining manipulated variables actually set to the LNG plant.

Therefore, when the input values to be actually used in the LNG plant 1 are to be determined, input values of the manipulated variables at and after a certain time with respect to the input values of the manipulated variables and the disturbances at the certain time are calculated with the use of the result of reinforcement learning as illustrated in FIG. 8 (Step S401). As a result, the input values of the manipulated variables with which the SP can be minimized at each time point are output. Subsequently, with the use of the magnitude of a residual between a past actual value of the SP and the predicted value of the SP of (a) of FIG. 9, for example, as a determination index, input values (that is, set values) of the manipulated variables with which stable operation can be achieved and which are to be used in the actual operation are determined (Step S402).

As a result, the set values of the manipulated variables with which the value of the SP becomes close to optimal on the plant model as shown by the horizontal line in (b) of FIG. 9 can be determined. With the use of the set values as operation guidance, and as new manipulated variables of the LNG plant 1 under the predetermined disturbance conditions, operation for reducing the value of the SP can be performed.

According to the operation guidance searching system of the embodiment, the plant model of the LNG plant 1 is generated through the machine learning, and further the reinforcement learning is performed to search for the values of the manipulated variables with which the compression power per unit production amount of the liquefied natural gas is minimized. As a result, optimal operation with respect to the disturbances can be performed.

In particular, the actual values of the process variables and the disturbances are used as the operation data and the disturbance data for generating the plant model. As a result, there is no fear that validity of optimal values cannot be determined due to the dissociation between a simulation result and the actual operation as in plant simulation, or it is not required to individually search for a condition in which the simulation converges. As a result, highly accurate prediction can be performed at high speed with the use of the large number of disturbances and process variables.

In the embodiment described above, the example in which the operation guidance searching method according to the embodiment is applied to the LNG plant 1 that uses the C3 refrigerant to precool the NG and cool the MR (liquefying refrigerant) has been described. It should be noted, however, that the LNG plant 1 to which the operation guidance searching method according to the embodiment is applicable is not limited to the example illustrated in FIG. 1.

For example, an LNG plant 1 of a single-stage compression MR system using only the mixed refrigerant (MR) as the liquefying refrigerant without using a precooling refrigerant and a refrigerant for cooling a refrigerant (in the embodiment, the C3 refrigerant) may be adopted.

Further, in a case of using a precooling refrigerant, an LNG plant 1 using a single liquefying refrigerant (refrigerant materials: nitrogen and methane) may be adopted. In contrast, also for the precooling refrigerant, without limiting to the case of using a single refrigerant material made of propane or propylene, for example, a mixed refrigerant made of methane, ethane, propane, or butane may be used. Further, an LNG plant 1 including a subcooler configured to subcool the LNG with the use of a subcooling refrigerant made of nitrogen and methane as refrigerant materials may be adopted.

In addition, this technology is also applicable to a cascaded LNG plant 1 configured to cool an NG sequentially with the use of a propane refrigerant, an ethylene refrigerant, and a methane refrigerant to obtain an LNG.

Further, the present invention is not limited to the case in which the operation guidance searching system 4 is provided at the location remote from the installation area of the LNG plant 1. The operation guidance searching system 4 may be provided as a part of an operation control system in a control room of the LNG plant 1.

What is claimed is:
1. An operation guidance searching method for a liquefied natural gas plant,
the liquefied natural gas plant including a liquefying heat exchanger configured to liquefy a natural gas with use of a liquefying refrigerant to obtain a liquefied natural gas, and a compressor configured to compress a refrigerant gas obtained after refrigerants including the liquefying refrigerant, which are used in the liquefied natural gas plant, are vaporized,
the operation guidance searching method comprising the steps of:
acquiring a plurality of data sets including operation data and disturbance data, the operation data indicating actual values of process variables at least including a compression power of the compressor and including controlled variables and manipulated variables for a plurality of target devices forming the liquefied natural gas plant, the disturbance data indicating actual values of disturbances affecting the process variables;
generating, through machine learning using a computer, based on the plurality of data sets, a plant model indicating correspondences of output values of process variables other than the manipulated variables with respect to the manipulated variables and input values of the disturbances; and
giving the input values of the disturbances and initial values of the manipulated variables to the plant model, and searching, through reinforcement learning using the computer, for input values of the manipulated variables with which the compression power per unit production amount of the liquefied natural gas is mini- mized under a condition in which an outlet temperature of the liquefied natural gas is a preset restriction temperature or lower.

2. The operation guidance searching method according to claim 1, further comprising a step of determining, based on a plurality of the input values of the manipulated variables retrieved in the step of searching for input values of the manipulated variables, input values to be actually used as the manipulated variables in operation of the liquefied natural gas plant.

3. The operation guidance searching method according to claim 1, wherein the disturbances include disturbances selected from a disturbance group consisting of an outside air temperature in an installation area of the liquefied natural gas plant, a supply pressure of the natural gas to the liquefied natural gas plant, composition of the natural gas, a supply temperature of the natural gas, and a supply amount of the natural gas.

4. The operation guidance searching method according to claim 1, wherein the machine learning includes generating the plant model with use of at least one of the following methods:
a deep neural network, support vector regression, random forest regression, and partial least squares.

5. The operation guidance searching method according to claim 1,
wherein the process variables other than the compression power of the compressor include process variables selected from a process variable group consisting of a temperature of the natural gas on an inlet side of the liquefying heat exchanger, a temperature of the liquefying refrigerant on the inlet side of the liquefying heat exchanger, and a discharge pressure at which the compressor discharges the liquefying refrigerant, and
wherein the manipulated variables include manipulated variables selected from an manipulated variable group consisting of a gas flow rate of the liquefying refrigerant, a liquid flow rate of the liquefying refrigerant, composition of the liquefying refrigerant, the number of rotations of a rotary driver in a case in which the compressor is driven by the rotary driver, and an opening degree of an inlet guide vane of the compressor.

6. The operation guidance searching method according to claim 5, wherein, when the refrigerants include at least one of a precooling refrigerant used to precool the natural gas before the natural gas is liquefied with the liquefying refrigerant, or a refrigerant for cooling a refrigerant used to cool the liquefying refrigerant, the process variable group further includes, as a process variable, at least one of a temperature of the precooled natural gas or a temperature of the cooled liquefying refrigerant.

7. An operation guidance searching system for a liquefied natural gas plant, comprising:
a data acquisition unit configured to acquire a plurality of data sets including operation data and disturbance data from the liquefied natural gas plant, the liquefied natural gas plant including a liquefying heat exchanger configured to liquefy a natural gas with use of a liquefying refrigerant to obtain a liquefied natural gas, and a compressor configured to compress a refrigerant gas obtained after refrigerants including the liquefying refrigerant are vaporized, the operation data indicating actual values of process variables at least including a compression power of the compressor, and including controlled variables and manipulated variables for a plurality of target devices forming the liquefied natural gas plant, the disturbance data indicating actual values of disturbances affecting the process variables;
a plant model generating unit configured to generate, through machine learning using a computer, based on the plurality of data sets acquired by the data acquisition unit, a plant model indicating correspondences of output values of process variables other than the manipulated variables with respect to the manipulated variables and input values of the disturbances; and
an operation guidance searching unit configured to give the input values of the disturbances and initial values of the manipulated variables to the plant model generated by the plant model generating unit, and search, through reinforcement learning using the computer, for input values of the manipulated variables with which the compression power per unit production amount of the liquefied natural gas is minimized under a condition in which an outlet temperature of the liquefied natural gas is a preset restriction temperature or lower.

8. The operation guidance searching system according to claim 7, wherein the plant model generating unit is configured to perform the machine learning with use of, as the disturbances, disturbance data on disturbances selected from a disturbance group consisting of an outside air temperature in an installation area of the liquefied natural gas plant, a supply pressure of the natural gas to the liquefied natural gas plant, composition of the natural gas, a supply temperature of the natural gas, and a supply amount of the natural gas.

9. The operation guidance searching system according to claim 7, wherein the plant model generating unit is configured to generate the plant model with use of at least one of the following methods: a deep neural network, support vector regression, random forest regression, and partial least squares.

10. The operation guidance searching system according to claim 7, wherein the plant model generating unit is configured to perform the machine learning with use of operation data of process variables selected from, as the process variables other than the compression power of the compressor, a process variable group consisting of a temperature of the natural gas on an inlet side of the liquefying heat exchanger, a temperature of the liquefying refrigerant on the inlet side of the liquefying heat exchanger, and a discharge pressure at which the compressor discharges the liquefying refrigerant, and operation data of process variables including, as the manipulated variables, manipulated variables selected from an manipulated variable group consisting of a gas flow rate of the liquefying refrigerant, a liquid flow rate of the liquefying refrigerant, composition of the liquefying refrigerant, the number of rotations of a rotary driver in a case in which the compressor is driven by the rotary driver, and an opening degree of an inlet guide vane of the compressor.

11. The operation guidance searching system according to claim 10, wherein, when the refrigerants include at least one of a precooling refrigerant used to precool the natural gas before the natural gas is liquefied with the liquefying refrigerant, or a refrigerant for cooling a refrigerant used to cool the liquefying refrigerant, the plant model generating unit performs the machine learning with use of operation data of process variables selected from the process variable group further including, as a process variable, at least one of a temperature of the precooled natural gas or a temperature of the cooled liquefying refrigerant.

\* \* \* \* \*